(12) United States Patent
Torngren

(10) Patent No.: US 6,357,162 B1
(45) Date of Patent: Mar. 19, 2002

(54) WHALE RELEASE APPARATUS FOR USE WITH FISHING GEAR

(76) Inventor: Frank A. Torngren, 39 Slater St., Attleboro, MA (US) 02703

( * ) Notice: Subject to any disclaimer, the term of this patent is extended or adjusted under 35 U.S.C. 154(b) by 0 days.

(21) Appl. No.: 09/475,501

(22) Filed: Dec. 30, 1999

Related U.S. Application Data

(60) Provisional application No. 60/114,667, filed on Jan. 4, 1998.

(51) Int. Cl.$^7$ .......................... A01K 97/00; A01K 75/00
(52) U.S. Cl. ................................. 43/4; 43/9.2; 43/17.2; 294/102.1
(58) Field of Search ............................. 43/4, 4.5, 9.2, 43/17.2; 114/217, 252; 294/102.1

(56) References Cited

U.S. PATENT DOCUMENTS

| | | | |
|---|---|---|---|
| 1,297,418 A | * | 3/1919 | Tarrant ........................ 114/217 |
| 4,072,122 A | * | 2/1978 | Balston ....................... 114/230 |
| 4,742,605 A | * | 5/1988 | Ritacco ........................ 24/602 |
| 4,826,229 A | * | 5/1989 | Smith ...................... 294/82.27 |
| 5,913,670 A | * | 6/1999 | Anderson et al. ............. 43/4.5 |
| 5,921,013 A | * | 7/1999 | Kaczynski, Sr. .............. 43/4.5 |

* cited by examiner

Primary Examiner—Kurt Rowan
(74) Attorney, Agent, or Firm—John A. Haug

(57) ABSTRACT

A device (10) having a cylinder housing (12) with a bore (12a) receives a piston sleeve (14) in which a tapered bore is formed in radially movable sections extending from the piston head. A rope gripping split sleeve (16) having a tapered outer circumference and formed of separable sections which are radially movable but maintained in axial alignment is received in the tapered bore of the piston sleeve. A rope is placed in the split sleeve which is inserted in the piston sleeve and in turn in the housing bore. A valve (18) disposed in the head (14a) of the piston sleeve allows piston movement inwardly but resists outward movement of the piston, allowing a metering fluid flow providing a timed release of the rope dependent on the force level applied. In a second embodiment device (100) includes a piston rod (122) attached to the piston sleeve which extends through a guide plug (116) into a compression chamber. Fluid is allowed to flow through a valve (128) in piston head (122b) when the piston is moved inwardly to set the device but fluid flow in the opposite direction is prevented by the valve. When sufficient outward force is applied to the rope, movement of the piston is enabled by a metering flow of fluid through a bore of a needle (130) extending through the piston plug (126). An interlocking member (14k, 122m) provides a minimum selected force for initial movement of the piston member from the set position.

17 Claims, 11 Drawing Sheets

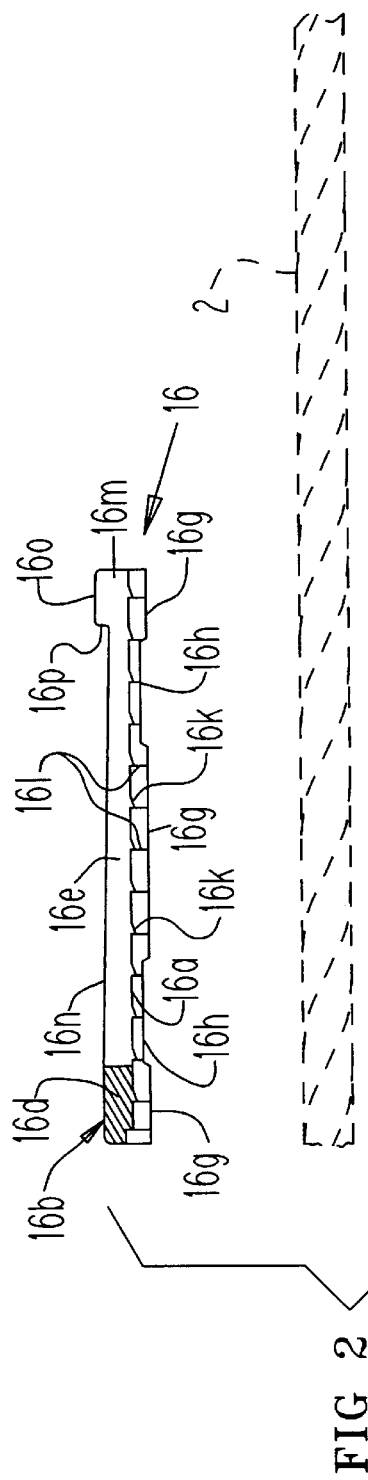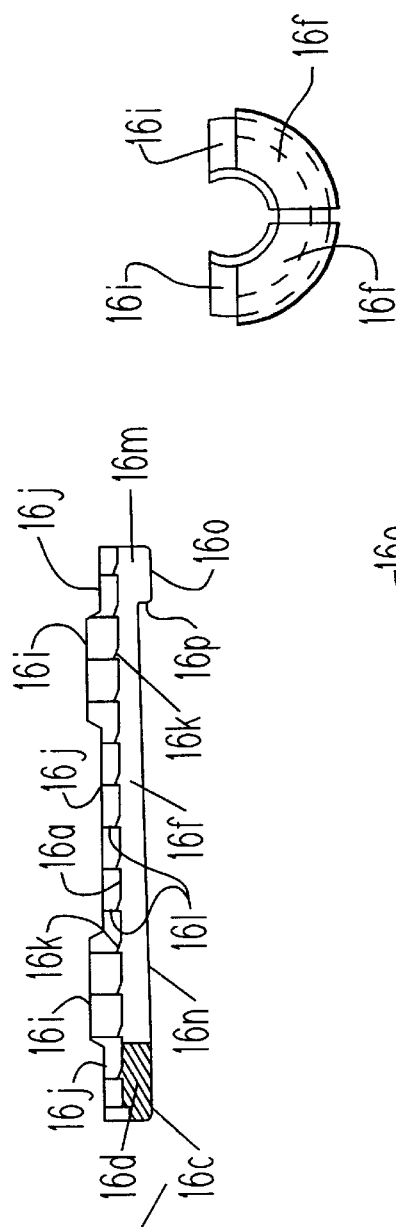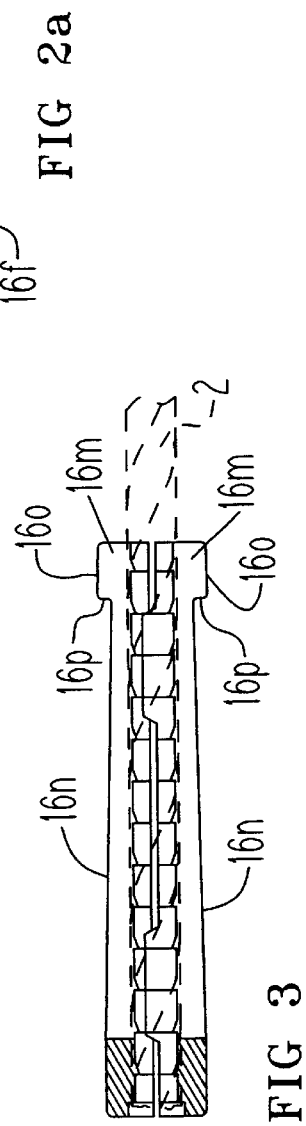

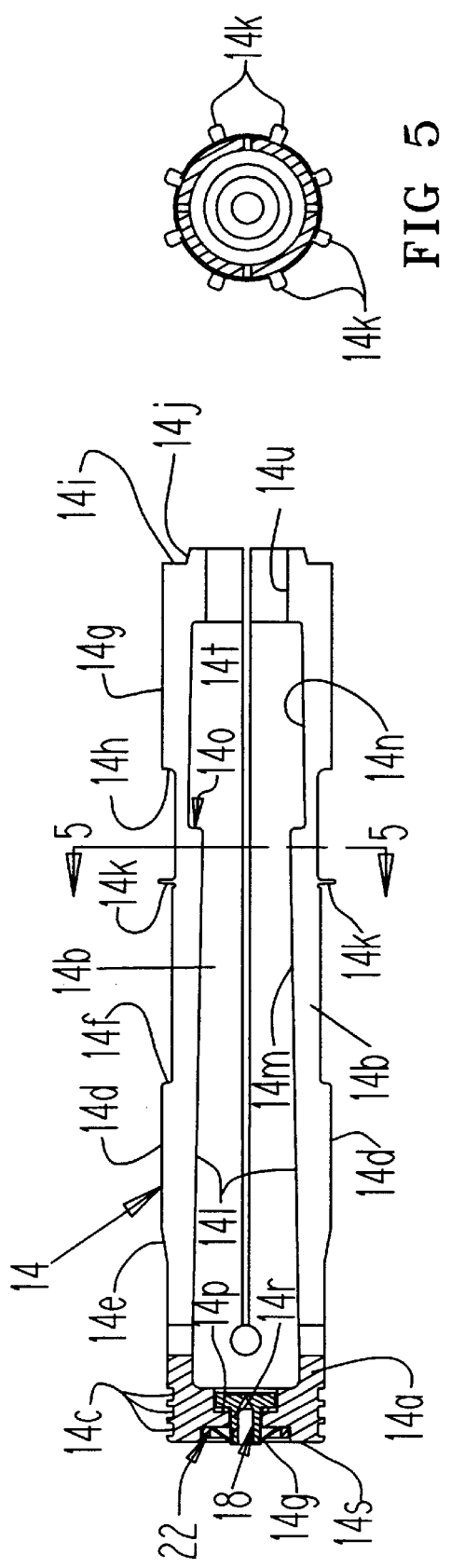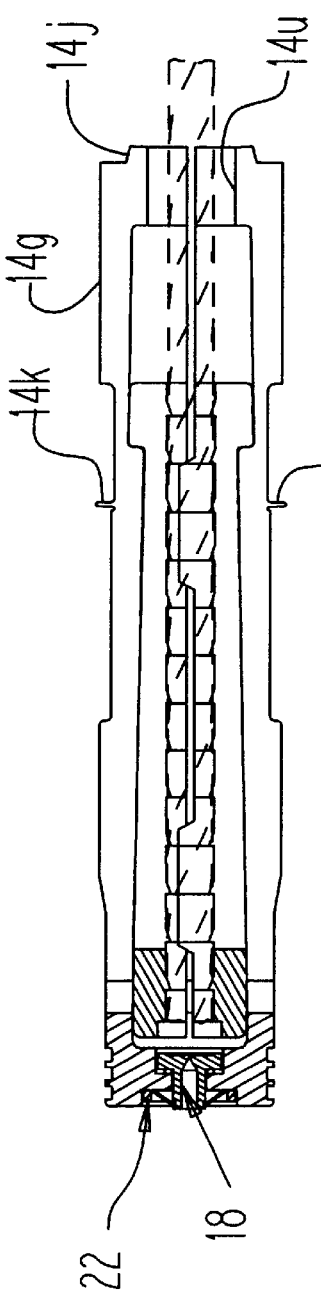
FIG 5
FIG 4
FIG 6

WHALE RELEASE APPARATUS FOR USE WITH FISHING GEAR

CROSS-REFERENCE TO RELATED APPLICATION

Benefit is claimed of Prov. Appl. No. 60/114,667, filed Jan. 4, 1998.

FIELD OF THE INVENTION

This invention relates generally to fishing gear such as nets and lobster traps and the like placed in bodies of water and more specifically to apparatus used for allowing whales which may become entangled in such fishing gear to break away before serious damage to the whales occurs.

BACKGROUND OF THE INVENTION

Entanglement of whales in fishing gear has become a world wide problem causing significant human-caused mortality to such whales through entanglement with passive fishing gear. The problem is especially severe with respect to certain species of whales, such as the Northern Right Whale, an endangered species with only some 300 believed to presently exist.

SUMMARY OF THE INVENTION

It is an object of the invention to provide apparatus which can be attached to fishing gear and which will allow an entangled whale to break free before serious injury to the whale can occur.

Briefly described, a whale release device made in accordance with a first embodiment of the invention comprises a cylinder having a bore with a closed end in which is slidably received a piston sleeve having a head formed with a circumferentially extending liquid seal and axially extending elongated sections which in turn define a bore formed with a taper. A rope gripping split sleeve member having radially movable but axially aligned sections and having a matching taper on its outer periphery is received in the tapered bore of the piston sleeve. A rope is inserted between the sections of the split sleeve which in turn is received in the bore of the piston sleeve. To set the device for operation, the piston sleeve along with the rope gripping split sleeve are pushed toward the closed end of the housing bore with the wall of the housing bore applying a radial bias on the piston sleeve which in turn is transferred to the rope gripping split sleeve. As the piston sleeve is pushed inwardly, fluid flows freely through a valve in the head of the piston sleeve. The piston sleeve is provided with tabs extending outwardly from its outer circumference and which are received in an increased diameter portion of the housing bore so that outbound movement of the piston sleeve is resisted. When the rope is pulled, the rope gripping split sleeve is compressed due to the tapers which increases the gripping force on the rope. When sufficient force is exerted on the rope, the piston sleeve moves outwardly creating a partial vacuum and enabled by a metered flow of fluid, i.e., sea water, through the valve until the outer part of the piston sleeve is outside the housing and the axially elongated sections are free to move radially outwardly thereby releasing the force on the split sleeve and in turn on the rope. In a second embodiment, a piston rod carrying a piston head extends inwardly from the piston sleeve and is received through a guide plug into a pressure chamber filled with fluid of a selected viscosity. Fluid is allowed to freely pass in one direction into one side of the chamber through a valve mounted in a piston plug in turn mounted on the piston head. Flow in the opposite direction is metered through a hollow needle providing a metered flow and consequent timed release. Preferably, an interlocking lip and notch are respectively formed in the end face of the piston head and one of the plugs to maintain the piston head in the closed position until a selected force is applied to the rope.

Additional objects and features of the invention will be set forth in part in the description which follows and in part will be obvious from the description. The objects and advantages of the invention may be realized and attained by means of the instrumentality's and combinations particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the objects, advantages and principles of the invention. In the drawings:

FIG. 2 is an exploded cross sectional view of a split sleeve used in the FIG. 1 device along with one end of a rope or line used to attach the device to a buoy or the like;

FIG. 2a is an end view of one of the sections of the FIG. 2 split sleeve;

FIG. 3 is a view similar to FIG. 2 but shown with the split sleeve clamping the line;

FIG. 4 is a cross sectional view of a piston and valve apparatus used in the FIG. 1 device;

FIG. 5 is a cross sectional view taken on lines 5—5 of FIG. 4;

FIG. 6 is a view similar to FIG. 4 but shown with the FIG. 3 structure received in a cavity or bore formed in the piston;

DETAILED DESCRIPTION OF THE PREFERRED EMBODIMENT

Figure 1:
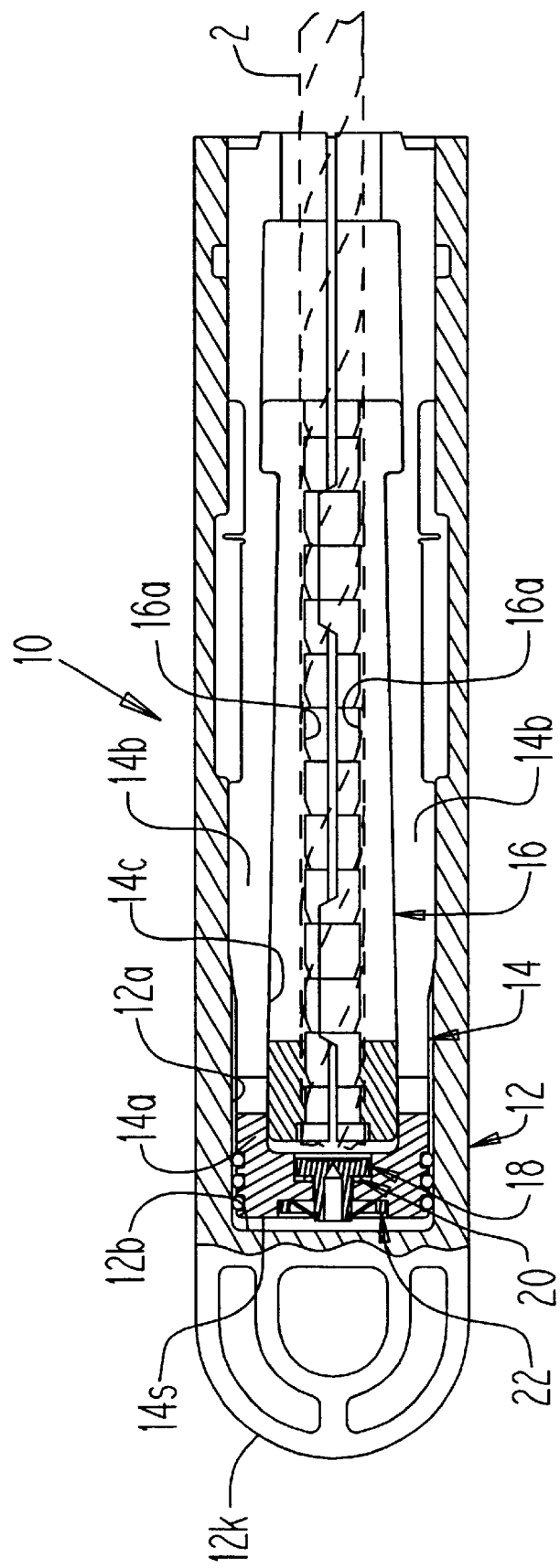
FIG. 1 is a cross sectional view of a whale release device made in accordance with the invention shown in a fully set condition.

Whale release 10 made in accordance with the invention is shown in FIG. 1 and comprises a generally cylindrical cylinder housing 12 formed with a bore 12a in which is received a piston sleeve 14 having a cylindrical head portion 14a and a plurality of generally axially extending sections 14b. Axially extending sections 14b in turn form a cavity or bore 14c in which is received a split sleeve 16 which is formed with a rope or line receiving inner surface 16a. These parts are preferably formed of inert, high strength, tough, slippery plastic material such as Delran. It is preferred that the material used have a specific gravity greater than sea water so that the device will sink when placed in the ocean.

As best seen in FIG. 2, rope gripping split sleeve 16 comprises mating sections 16b, 16c, each having a head portion 16d and axially extending fingers 16e and 16f respectively. As shown, each section 16b, 16c is formed with two fingers (see FIG. 2a) however, three or more fingers could be provided if desired. Sections 16b and 16c are formed with interfitting tongue and groove portions, tongues 16g and grooves 16h on section 16b and tongues 16i and grooves 16j on section 16c, to permit independent radial movement of the sections while maintaining the sections axially aligned with one another. The inside surface 16a of the sections taken together is generally cylindrical and formed with a plurality of ribs 16k spaced a selected distance apart, such as approximately one half inch, preferably formed with a relatively sharp, rope engaging edge. Ribs 16k are formed so that surface 16l of each rib closest to the head portion 16d extends in a generally radial direction to improve the rope gripping ability. The free distal ends of fingers 16e, 16f are formed with an enlarged periphery 16m, and with an abrupt transition surface 16p. The axially extending outer surface 16n of fingers 16e, 16f, as well as the axially extending outer surface 16o of distal end portions 16m, are formed with a slight taper, for example approximately 2 degrees, with the radius of the surface decreasing as one goes in the direction from the head 16d toward the distal free end of the fingers.

An end of line 2 is placed between sections 16b, 16c of rope gripping split sleeve 16 and the sections are fitted together as seen in FIG. 3, the assembled split sleeve 16 and line 2 is then placed within axially extending sections 14b of piston sleeve 14 as shown in FIG. 6. Piston sleeve 14, as best seen in FIG. 4, comprises a cylindrical head portion 14a having a plurality of circumferential O-ring grooves 14c. Axially extending sections 14b, when in an at rest position preferably are somewhat spread apart, for example, several degrees (not shown). The axially extending sections are formed with a generally cylindrical outer surface having a first enlarged diameter portion 14d intermediate to the fixed end of the sections and the center thereof and formed with a tapered transition surface 14e at one end and an abrupt transition surface 14f at its opposite end. A second enlarged diameter portion 14g is formed adjacent to the free distal end of sections 14b and has an abrupt transition surface 14h at the inboard end thereof. The end face 14i is preferably formed with an inclined surface 14j to be discussed below.

A plurality of circumferentially spaced, radially extending tabs 14k project outwardly from a selected axial location intermediate to enlarged diameter portions 14d, 14g. A generally cylindrical bore 141 is formed in sections 14b, taken together, the bore formed with a surface 14m having a taper the same as, but opposite to, that of tapered surface 16n of split sleeve 16. Bore 141 is also provided with a recessed surface 14n having the same taper as that of surface 16o, but opposite to, and with transition surface 14o being relatively abrupt. An abrupt transition surface 14t extends from the opposite end of recessed surface 14n to a line receiving bore 14u. Head 14a is formed with a valve receiving recess 14p on the side of the head adjacent to sections 14b and a bladder receiving recess 14q on the outer end face 14s of head 14a, the recesses connected by a reduced diameter bore 14r.

Figure 8:
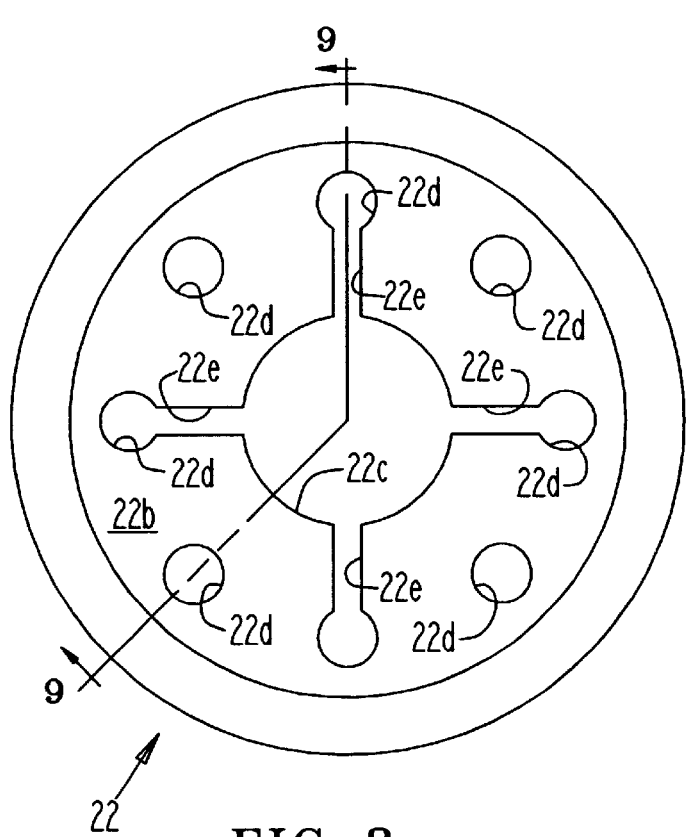
FIG. 8 is a left side view of a valve bladder used in the FIG. 1 device.
Figure 9:
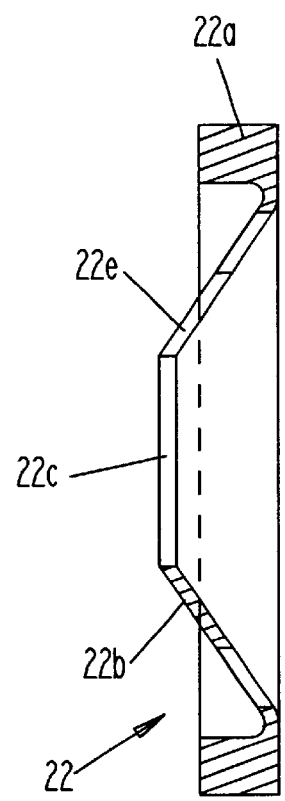
FIG. 9 is a cross sectional view taken on line 9—9 of FIG. 8.
Figure 10:
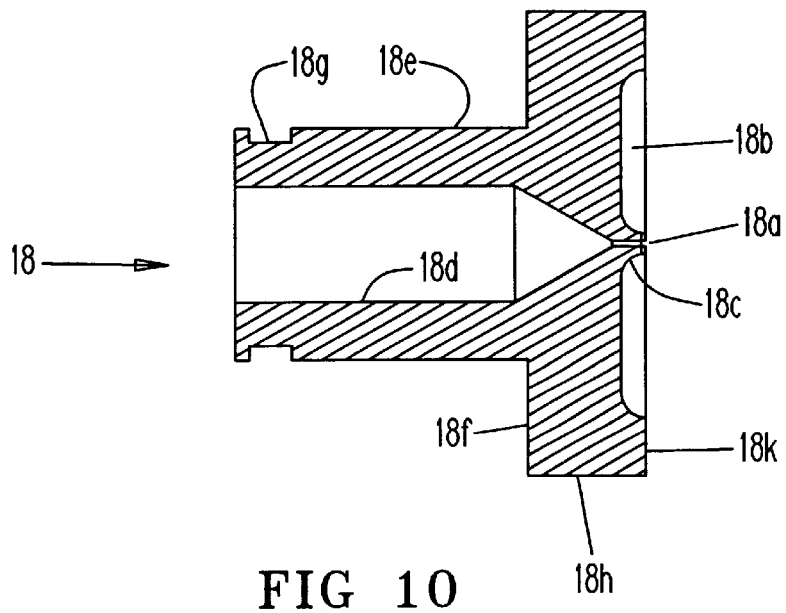
FIG. 10 is a cross sectional view of a valve member used in the FIG. 1 device.

Valve member 18, seated in recess 14p along with O-ring 20 and extending through bore 14r and bladder 22 received in recess 14q of piston sleeve 14 are shown in FIG. 1. With particular reference to FIGS. 8–10, valve member 18 is generally cylindrical having a plate portion 18h and hub 18e and a centrally disposed, axially extending orifice 18a of a suitable, small diameter, such as 0.006 inch. A recess 18b is formed in the end face 18k of the valve member and is provided with a smooth radiused surface 18c surrounding the orifice to enhance flow of water therethrough. Orifice 18a communicates with enlarged diameter bore 18d which extends through hub portion 18e. Rear wall 18f of plate portion 18h is received against the bottom wall of recess 14p with an O-ring 20 therebetween as seen in FIG. 1. Hub portion 18e is formed with a bladder receiving circumferential groove 18g. Bladder 22 is formed of suitable, chemically inert, spring material and has an outer, cylindrical rim 22a with a truncated conical wall 22b having a centrally disposed bore 22c. Wall 22b extends inwardly from the rim and in a direction toward end face 14s of piston 14. A plurality of apertures 22d are formed through wall 22b with slots 22e formed between at least some of the apertures and bore 22c to form, in effect, a plurality of spring blades as well as to provide a water passage, as will be explained below. The lip of wall 22b defining bore 22c is snapped into bladder receiving groove 18g using an appropriate tool. This places a bias on valve element 18 which tends to move the valve element away from its seat, for a purpose to be discussed below.

Figure 7:
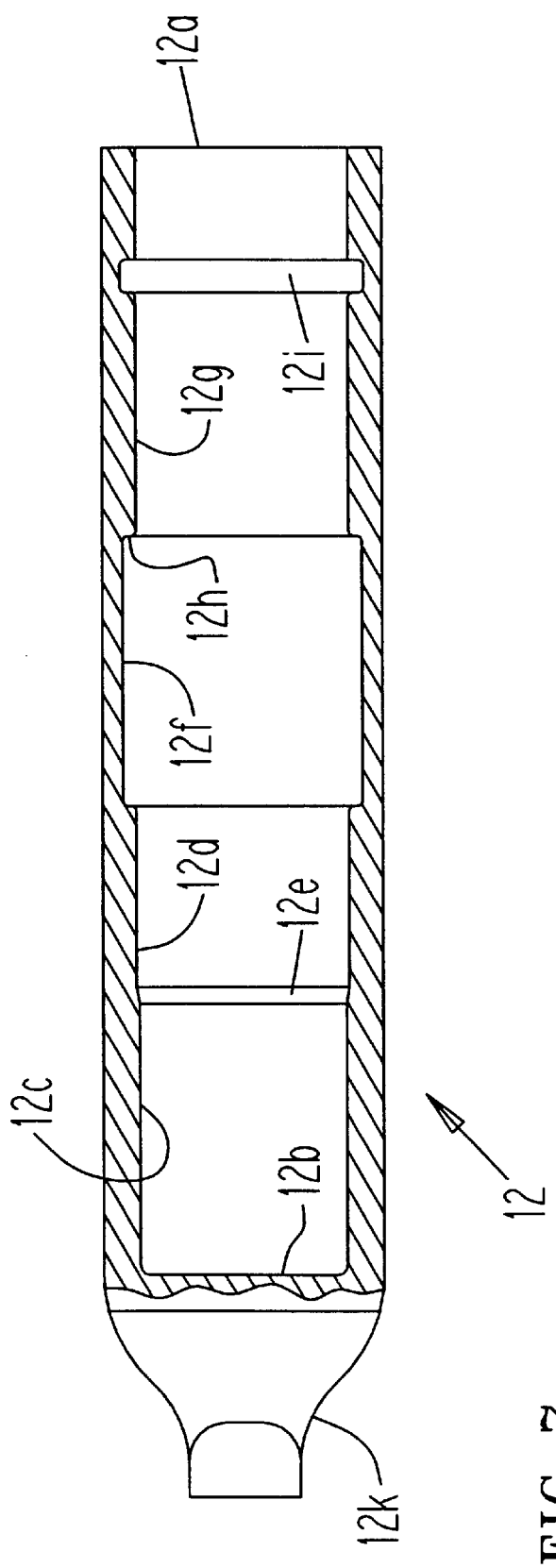
FIG. 7 is a partial cross sectional view of a cylinder housing used in the FIG. 1 device.

Cylinder housing 12, shown best in FIG. 7, comprises a tubular cylindrical body having an open end 12a and an opposed closed end 12b and formed with a bore 12c having an enlarged diameter portion 12d over a first axial length with a tapered transition wall 12e which interacts with tapered wall portion 14e of piston sleeve 14 to limit inward axial travel of the piston into bore 12c. A second axial length portion has a still larger diameter portion 12f which is adapted to receive enlarged diameter 14d of piston sleeve 14 upon movement of the piston to that axial position which allows sections 14b of the piston to spread apart to a normal spread apart position. A third axial length has a surface portion 12g having a slightly smaller diameter than portion 12f and is formed with an abrupt transition surface 12h therebetween. A circumferential groove 12i is formed slightly inboard of open end 12a which is adapted to receive tabs 14k which extend radially outwardly from piston sleeve 14 a distance which causes an interference fit with surface portion 12g even when sections 14b are compressed together. With reference to FIG. 1, piston 14, rope gripping split sleeve 16 and line 2 are received in bore 12c with one, two or three O-rings, as desired, (not shown) received in grooves 14c, as discussed above, ready for use.

In situ, whale release device 10 is attached to fishing gear such as lobster traps (not shown) via coupling 12k with line 2 extending up to a suitable buoy (not shown) or the like. In the FIG. 1 position, face 14s of the piston is closely adjacent to closed end 12b of cylinder bore 12a with its inward movement limited by the interaction of tapered wall portions 14e of piston 14 and 12e of cylinder housing 12. Line 2 is tightly grasped by split sleeve 16 with a radially inward force applied to split sleeve 16 through axially extending sections 14b of piston 14 which are constrained by bore portions 12d and 12g and with tabs 14k received in bore portion 12f without any interference. The assembly will remain in the FIG. 1 position indefinitely with a pull force of up to approximately 300 pounds exerted on line 2 caused by ocean currents, wind, tides, waves, drag encountered in returning gear to the ocean, and the like.

Figure 11:
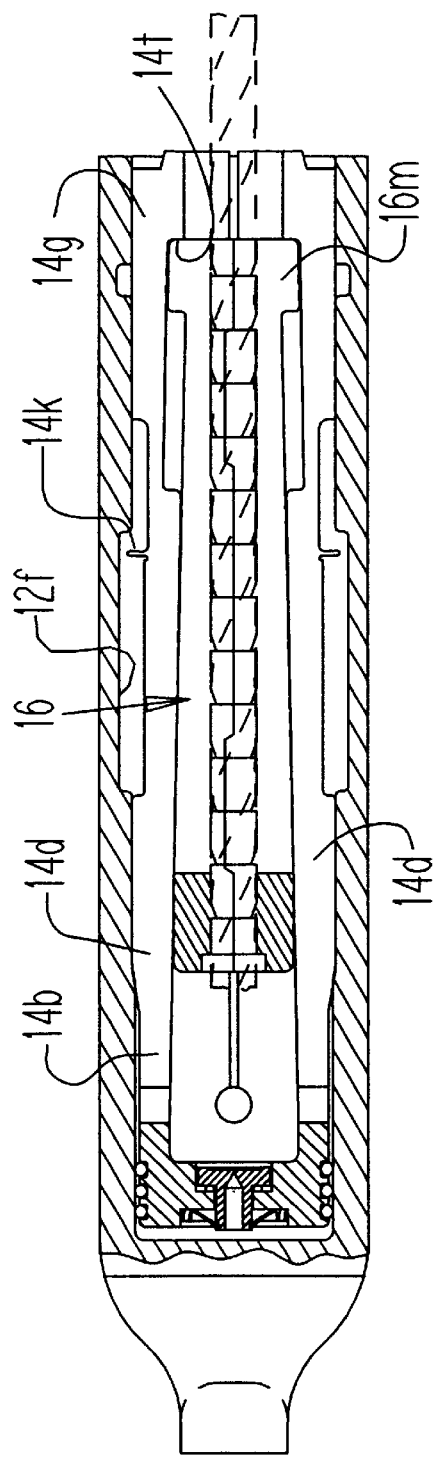
FIGS. 11–13 are views similar to FIG. 1 showing the whale release device in different operational modes.

In the event that a pull force is exerted on line 2 in excess of the above noted level, for example 1000 pounds, a timed release is initiated. As seen in FIG. 11, split sleeve 16 moves within the bore formed by axially extending sections 14b with the taper 16n, 16o of the split sleeve moving against the opposite taper 14m, 14n, respectively, thereby squeezing line 2 to a greater extent, with ribs 16k biting further into the line, until a maximum squeezing action is obtained when distal end portions 16m butt up against transition surface 14t of the piston. As shown, the total travel of split sleeve 16 is approximately 1.25 inches, however the specific length is a matter of choice. Up to this point piston 14 has not moved relative to cylinder housing 12.

Figure 12:
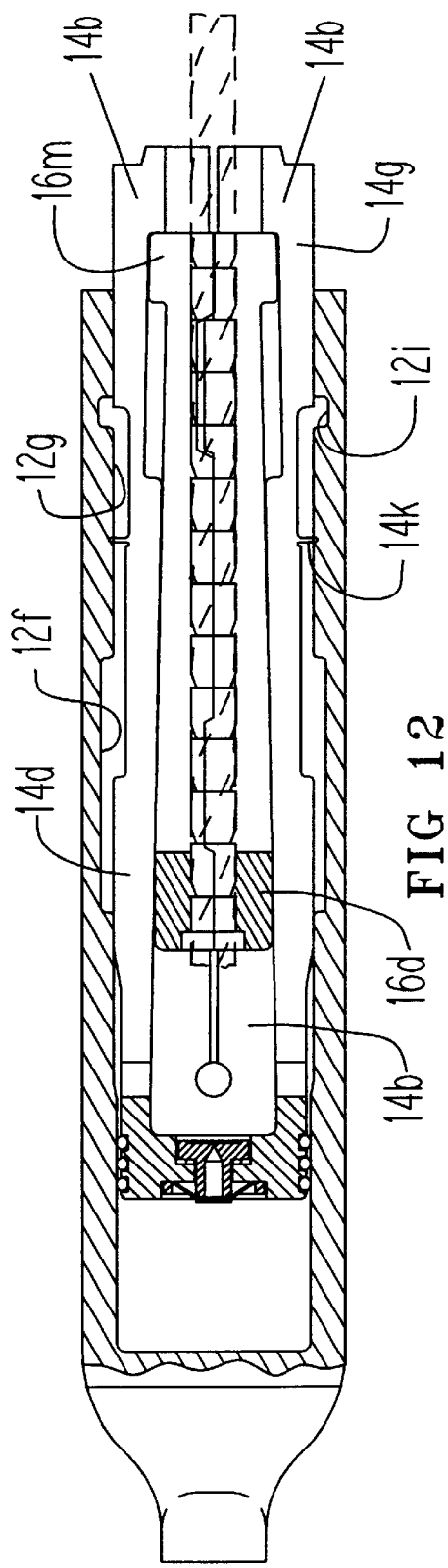
Figure 13:
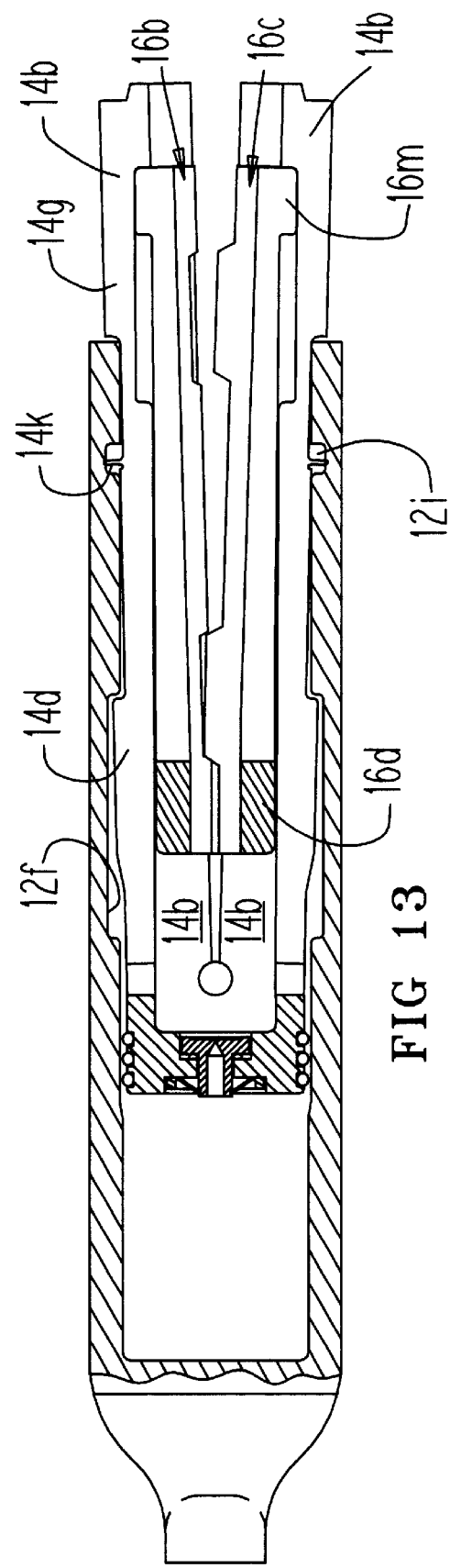
Figure 15:
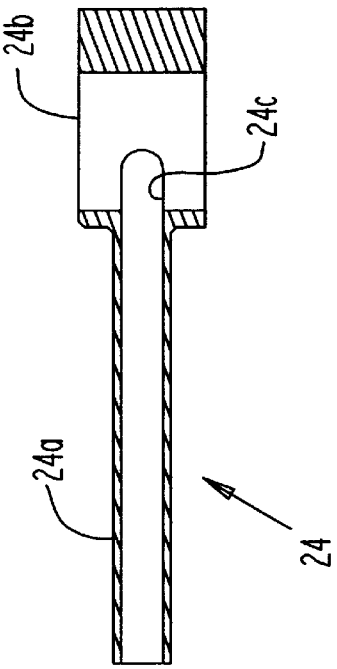
FIGS. 14 and 15 are horizontal cross sectional views of second and first punch members used for resetting the FIG. 1 device.
Figure 16:
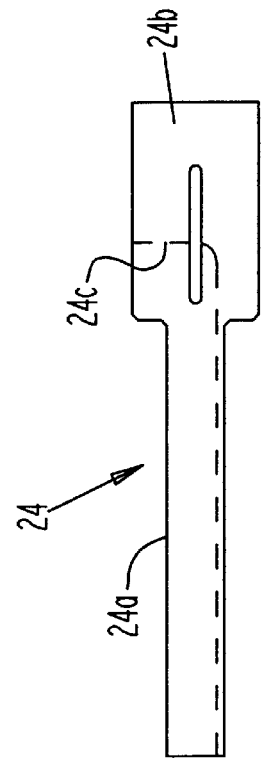
FIG. 16 is a front view of the FIG. 15 punch member.
Figure 14:
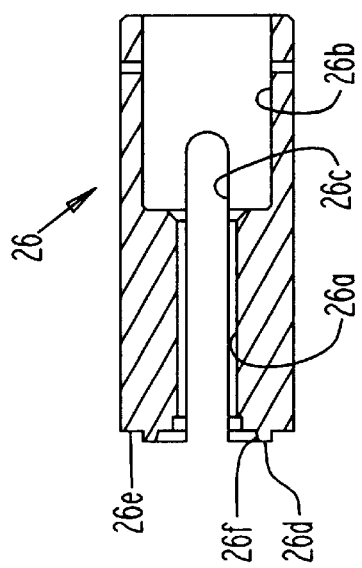
Figure 17:
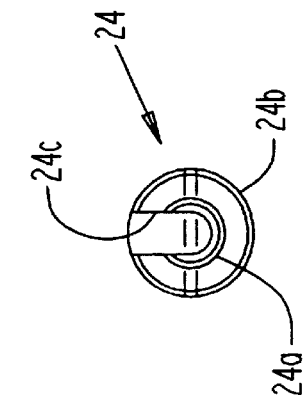
FIG. 17 is a left end view of the FIG. 16 punch member.

With reference to FIG. 12, as the pull force continues, the force is transferred directly to transition surface 14t of piston sleeve 14 through distal end portions 16m and the piston starts to move outwardly with tabs 14k forming an interference fit with diameter portion 12g and being forced to move through that portion. The amount of interference is chosen so that there is only a slight flexing of tabs 14k and with eight tabs, as shown, the particular number being a matter of choice, a significant amount of force is required to continue such movement. It has been found that an interference of approximately 0.004 inch is suitable. Outward movement of piston sleeve 14 is also resisted by vacuum created between face 14s of the piston and the closed end of bore 12b. Movement of the piston is enabled by sea water which is sucked through orifice 18a which, as stated above, has a size which is chosen so that its opening is sufficiently small that a selected time delay is obtained for the piston to travel to the FIG. 13 position where enlarged diameter portion 14d of piston sleeve 14 is received in enlarged diameter bore portion 12f of cylinder housing 12 and enlarged portion 14g is disposed outside of the cylinder bore thereby allowing sections 14b to spread apart and split sleeve portions 16b, 16c to relax and release line 2 with no knots or plastic components attached to the line. Tabs 14k are received in groove 12i which serves to prevent further outward movement of piston 14 now that the pull force has been removed. The specific time delay for the release is dependent upon the level of the sustained pull force exerted on line 2 but typically a 1200 to 1500 pound load will result in a time delay of 20 to 30 minutes. The length of the delay can be adjusted by the number of O-rings used in grooves 14c of piston 14, the size of orifice 18a in valve element 18 as well as the friction of the side walls.

In retrieving from the ocean, traps and other gear attached to whale release device 10, a partial release may occur, particularly if the line becomes ensnared by obstacles on the sea bed, such as rock formations. In order to reset release device 10, piston 14 is pushed inwardly to force water that has accumulated in bore 12c between the piston and the closed end of the bore. Valve member 18 is urged away from its seat by the spring action of bladder 22 allowing water to freely pass through openings 22d, 22e of the bladder and past valve member 18 which has an outer diameter less than that of recess 14p. A reset mechanism for this purpose is shown in FIGS. 14–17 which comprises first and second punch members 24,26, respectively. First punch member 24 shown in FIG. 15 has an elongated tubular member 24a and is formed with a line receiving slot 24c extending the length of tubular member 24a and into head 24b. Second punch member 26 has a first bore 26a adapted to slidingly receive elongated tubular member 24a therethrough and which opens to a second, larger bore 26b which is adapted to receive head portion 24b. A slot 26c extends through the side wall of punch member 26 in communication with bore 26a along its entire length and in communication with bore 26b along a portion of its length. Second punch member 26 is provided with a circular flange 26d on its end face 26e, the flange having an inclined camming surface 26f. The axial length of head 24b is longer than the axial length of bore 26b for a purpose to be described. In use, elongated tubular portion 24a is inserted into bore 26a with the slots 24c, 26c aligned and the reset mechanism is positioned against whale release device 10 with line 2 received through the slots. The distal end of elongated tubular portion 24a is placed in contact with distal end portions 16m and head 24b is then struck with a mallet or the like to move split sleeve and line 2 all the way back into the cavity of piston 14. Camming surfaces 26f then come into engagement with inclined surfaces 14i of sections 14b and moves the sections radially inward toward each other allowing transition surface to pass into diameter portion 12g of bore 12c. Further hitting of head 24b will transfer force to transition surface 14o via distal end portions 16m of split sleeve 16 moving the piston back to the FIG. 1 position. The punches then can be easily removed due to slots 24c, 26c.

Whale release devices 10 have been made in accordance with the invention just over 9 inches in length so that they are compact, easy to handle and require minimal storage space.

In the embodiment of FIGS. 1–13 operation of the whale release device is based on creating a partial vacuum. With reference to FIGS. 18–23a, a second embodiment is based on creating compression. Cylindrical, tubular housing 112 is formed with a bore 112a formed with spaced apart threaded portions 112b, 112c which respectively receive a threaded cylinder end plug 114 to form a closed end of bore 112a and a threaded annular guide plug 116 creating a chamber 112d between the two plugs. Axially extending recesses 114a, 116a are formed in respective end faces of the plugs to facilitate installation. Suitable Teflon tape or the like is placed between the threads to form an effective fluid seal.

Figure 21:
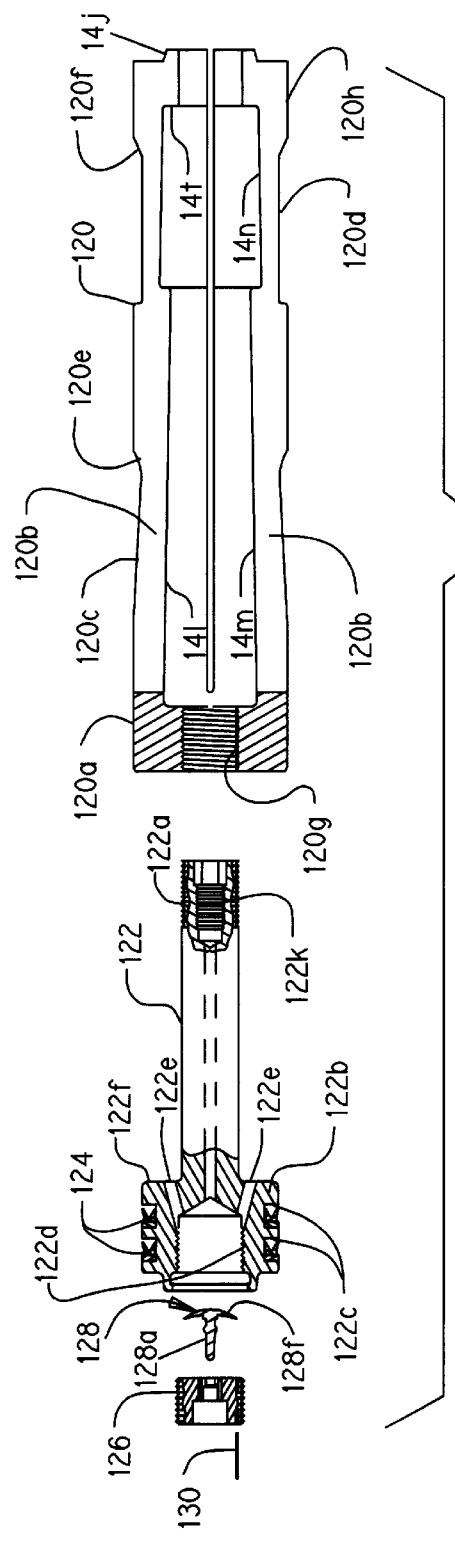
FIG. 21 is a blown-apart view, partly in cross section, showing components of the piston assembly of the second embodiment.

Piston sleeve 120, best seen in FIG. 21, comprises a head or body portion 120a having an outer diameter selected to be slidingly received in bore portion 112e of housing 112, slightly larger than bore 112a. Piston sleeve 120 is formed with axially extending sections 120b, corresponding to sections 14b of piston sleeve 14 of the first embodiment described above. Axially extending decreased outer diameter portions 120c, 120d are formed in the outer circumferential surface of piston sleeve 120 with a tapered transition surface 120e, 120f, respectively on the outboard end of the decreased diameter portions, i.e., on the right side as viewed in FIG. 21. Inclined surfaces 14j are formed on the end face, as in the first embodiment, for resetting as described above. Head portion 120a is formed with a threaded, coaxially extending bore 120g.

Figure 22A:
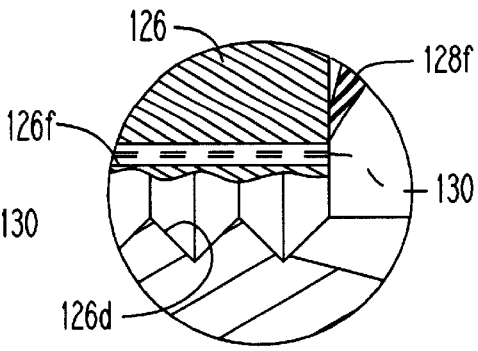
FIG. 22a is a still further enlarged portion of FIG. 22.
Figure 22:
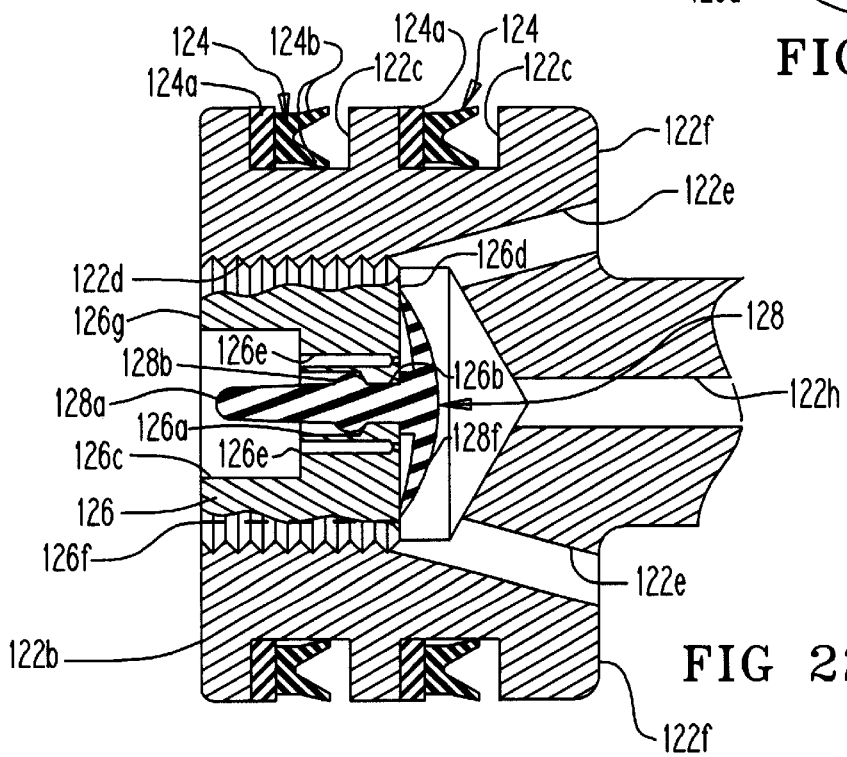
FIG. 22 is an enlarged portion of the piston head shown in FIGS. 18–20.

Piston rod 122 has a threaded end 122a at one end received in threaded bore 120g of head portion 120a and a piston head 122b at its opposite end. As best seen in FIG. 22, piston head 122b is formed with circumferential grooves 122c in which are received high pressure flexible seal members, such as Parker U-shaped seals 124 with an optional back-up ring 124a. U-shaped seals 124 are formed with legs 124b which spread apart when exposed to high pressure on the side facing the opening between the legs. A threaded bore forming a recess 122d is formed in the inbound end face of piston head 122b with first and second fluid channels 122e extending from the outer peripheral portion of the inner end of the recess to the outboard end surface 122f. A fluid loading channel 122h extends centrally from recess 122d through piston rod 122 to an axially extending threaded bore 122k, to be discussed below.

A threaded piston plug 126, received in threaded bore 122d, has a coaxially extending stepped bore having larger diameter portion 126a extending from recess 126c on the inboard end side of piston head 122b, coupled to smaller diameter portion 126b extending from end face 126d of plug 126. An umbrella valve member 128 having a stem 128a formed with an enlarged bulb portion 128b intermediate its ends, extends from a flexible flap 128f. Stem 128a is pulled through bores 126a, 126b, stretching the stem and allowing bulb portion 128b to pass through and snap in place beyond the smaller diameter bore 126b. A plurality of bores 126e extending from recess 126c to end face 126d are formed through plug 126 closely adjacent to the stepped bore. Flap 128f will allow flow through the valve when the piston is moved toward the closed end but will prevent fluid flow when the piston moves in the opposite direction. A small diameter bore 126f is formed through plug 126 from end face 126g to end face 126d near its outer periphery at a location out of alignment with flap 128f of the umbrella valve element. An open ended tubular needle 130 (FIG. 21), formed of suitable material such as stainless steel, is placed in bore 126f and sealed therein with suitable epoxy material. Needle 130 is formed with an internal diameter bore and length selected to provide a selected rate of fluid flow for fluid having a given viscosity. The internal diameter can typically range from approximately 0.003 inch to approximately 0.010 inch. When using a fluid such as corn oil, an internal diameter bore of 0.003 inch has been found to be suitable.

Piston rod 122 is received through the bore of annular guide plug 116 which is provided with U-shaped seals 132, similar to seals 124, disposed so that the legs face chamber 112d, which are biased against the piston rod. Chamber 112d is filled with fluid having a selected viscosity, such as corn oil referenced above, and then bolt 136, with washer 134, is used to close channel 122h and fixedly attach piston rod 122 to piston sleeve head 120a.

Figure 18:
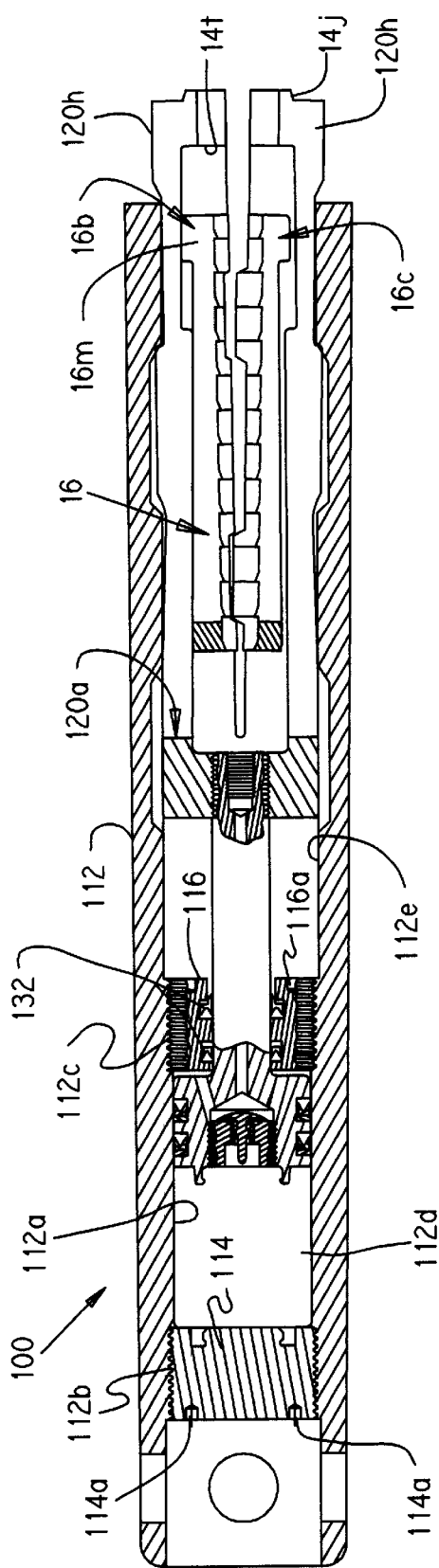
FIG. 18 is a view similar to FIG. 12 of a whale release device made in accordance with a second embodiment of the invention shown in the open or released position.
Figure 19:
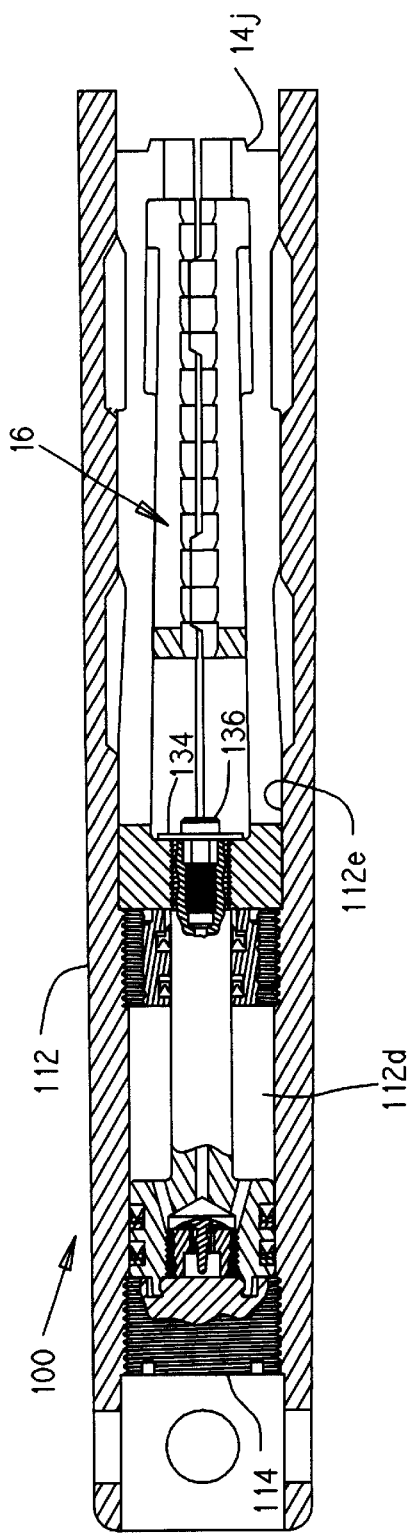
FIG. 19 is a view of the FIG. 18 device shown with the rope gripping split sleeve member butting against the outboard end of the piston sleeve in the maximum compression rope gripping position.
Figure 20:
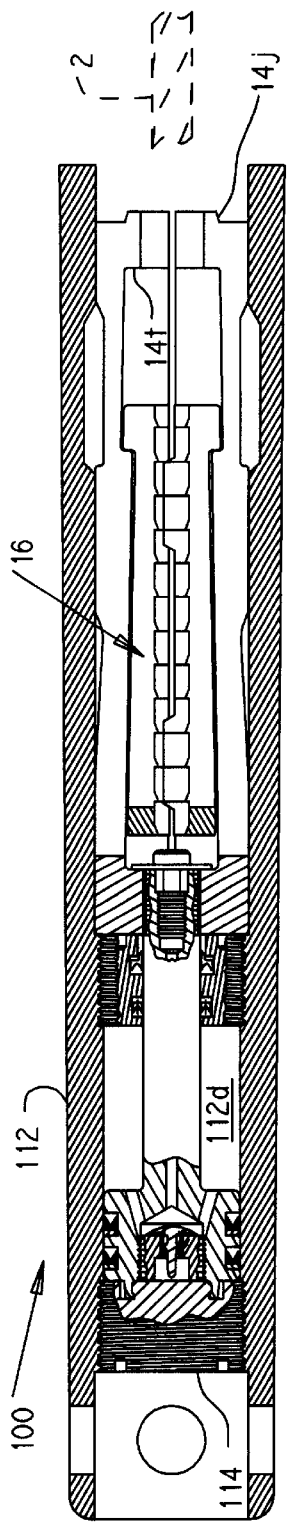
FIG. 20 is a view of the FIG. 18 device shown in the reset or closed position.

As in the first embodiment, the end of a rope is received in rope gripping split sleeve 16 disposed in bore 141 of piston sleeve 120 in the released or open position, FIG. 18, and set to the closed position, FIG. 20. Pulling on rope 2 then causes the split sleeve 16 to move against the tapered surfaces to further compress and firmly grasp the rope with the ridges of ribs 16k biting into the rope.

When a further force, caused by a whale caught in the fishing gear attached to the release device, pulling the fishing gear up to the surface by a fisherman, or the like, is applied to the rope, the rope gripping split sleeve travels against the taper until it butts against surface 14t of piston sleeve 120 (FIG. 19) and pulls the piston sleeve and piston head 122b outwardly creating pressure on the fluid in chamber 112d forcing flap 128f of the umbrella valve against end face 126d closing the valve and forcing fluid through metering needle 130 to allow movement with the rope finally being released when the outer portion 120h passes beyond the end of housing 112 as shown in FIG. 18, thereby resulting in a timed release dependent upon the particular force level transferred.

In the case where a fisherman hauls the fishing gear onto the deck of a boat, the piston mechanism has generally moved to some extent from the closed position and is reset using the reset mechanism shown in FIGS. 14–17, discussed above in which the rope gripping split sleeve 16, piston sleeve 120 and piston 122b are moved to the closed FIG. 20 position.

Figure 23A:
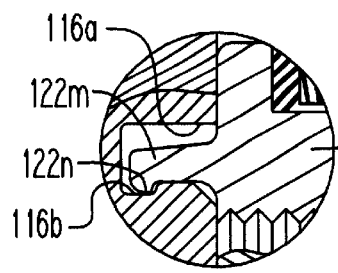
FIG. 23a is a further enlarged portion of FIG. 23.
Figure 23:
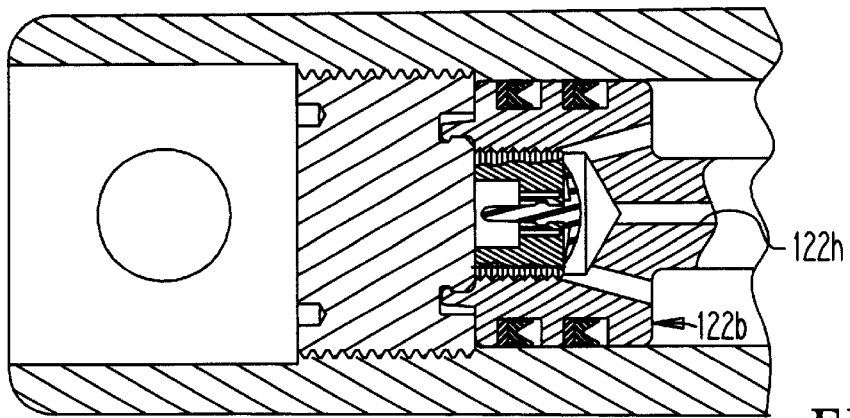
FIG. 23 is an enlarged broken away portion of FIGS. 19,20 showing an interlocking mechanism.

With reference to FIGS. 23, 23a, it is preferred to provide a means to prevent movement of the piston assembly until a selected pulling force on the rope has been exceeded, similar to the function of tabs 14k in the first embodiment. Such means prevents winds, currents and the like from causing gradual movement of the piston over time. Piston head 122b is preferably formed with longitudinally extending flange 122m having a radially, inwardly extending lip 122n at the free end thereof. Flange 122m is receivable in an annular recess 116a formed with a cut-away notch portion 116b which interfits with lip 122n. The interfitting lip and notch will lock piston head 122b in the closed position until a selected force, e.g., 200 lbs, is applied to the rope. It will be appreciated that flange 122m and lip 122n could be formed as spaced fingers, if desired.

This embodiment provides higher pressure—up to 2,000 psi—to more easily provide any required holding force. The closed fluid system is particularly advantageous in that it is free of possible contaminants which might occur when using sea water as in the first embodiment, e.g., sand, salt, etc. Release time is based on the viscosity of the fluid used as well as the internal diameter of the bore of needle 130. When a fisherman pulls up his gear from the water he has a given amount of time, based on the particular level of force used, to get it on deck before the device releases. This time can be easily varied by using a needle with a different internal diameter bore and length as well as using fluid having different viscosity.

Although the invention has been described with regard to specific preferred embodiments thereof, variations and modifications will become apparent to those skilled in the art. It is therefore, the intention that the appended claims be interpreted as broadly as possible in view of the prior art to include all such variations and modifications.

What is claimed:

1. Whale release apparatus for use with fishing gear comprising
    a housing having a bore formed with a first, closed inbound end and a second, open outboard end,
    a piston member having a bore slidably received in the bore of the housing, the piston member having a radially movable portion and a radially immovable portion, an elongated rope gripping member having a radially movable portion receivable within the bore of the piston member,
    a valve mounted on the piston member permitting fluid flow therethrough in at least one direction,
    a rope being received in the rope gripping member which in turn is received within the bore of the piston member with the piston member disposed adjacent to the first, closed end of the housing bore to set the apparatus with the rope gripping member biased against the rope whereby movement of the rope and rope gripping member in a direction going from the first end of the bore of the housing to the second end of the bore of the housing is enabled by fluid flow through the valve in dependence upon the force until at least a portion of the piston member and rope gripping member protrude beyond the second, open end of the housing allowing the rope gripping member to release the rope.

2. Whale release apparatus according to claim 1 in which the piston member has a free end and is formed with a reduced diameter portion disposed a selected longitudinal axial length from the free end so that when disposed outside the housing bore, the movable portion of the piston member is free to move radially outwardly a limited amount.

3. Whale release apparatus according to claim 1 in which the bore of the piston member has an enlarged diameter portion along a portion of the axial length of the piston member and the rope gripping member has an enlarged outer periphery extending over an axial length less than the axial length of the enlarged diameter portion in which the enlarged outer peripheral portion is normally received so that the rope gripping member can travel in an axial direction a selected distance relative to the piston member.

4. Whale release apparatus according to claim 3 in which the bore of the piston member has an inboard end and an outboard end and has a taper with the internal diameter of the bore decreasing in the direction going from the inboard end to the outboard end and the rope gripping member has an inboard end and an outboard end and has an outer diameter formed with a taper with the outer diameter decreasing in the direction going from the inboard to the outboard end.

5. Whale release apparatus according to claim 4 in which the taper of the piston member bore and the outer diameter of the rope gripping member is approximately 2 degrees.

6. Whale release apparatus according to claim 3 in which the immovable portion of the piston member is a piston head formed with a peripheral seal thereabout to form a liquid seal between the piston member and the bore of the housing and the radially movable portion comprises at least two axially extending sections.

7. Whale release apparatus according to claim 3 in which the piston member is formed with an enlarged diameter portion and the housing bore has an inboard end and an outboard end and has a correspondingly enlarged diameter portion to serve as a stop to limit travel of the piston member in the direction going from the outboard end to the inboard end.

8. Whale release apparatus according to claim 3 further comprising at least one tab extending radially outwardly from the piston member forming an interference fit with at least a portion of the bore of the housing.

9. Whale release apparatus according to claim 3 in which the rope gripping member comprises at least two separable sections having interfitting tongues and grooves which allow radial movement of the separable sections while maintaining axial alignment relative to one another.

10. Whale release apparatus according to claim 3 in which the rope gripping member has a bore formed with a plurality of spaced apart transversely extending rope engaging ridges.

11. Whale release apparatus according to claim 3 in which the valve allows restricted fluid flow in one direction and less restrictive flow in an opposite direction.

12. Whale release apparatus according to claim 3 further comprising a guide plug having a bore therethrough received in the housing bore forming a fluid chamber in the housing, a piston rod extending from the piston member through the bore of the guide plug, the piston rod having a piston head at a free end of the piston rod, the piston head having an inboard end and an outboard end, the piston head having a recess in the inboard end in which the valve is received and a fluid channel extending from the recess to the outboard end and a metering fluid passage extending from the outboard side of the piston head and the inboard side of the piston head, and a fluid having a selected viscosity received in and filling the chamber.

13. Whale release apparatus according to claim 12 in which the metering fluid passage includes a portion having a diameter of approximately 0.003 inch.

14. Whale release apparatus according to claim 12 in which a piston plug is received in the recess in the piston head, the piston plug having a stem receiving bore therethrough and an umbrella valve having a flexible flap portion attached to a stem, the stem received in the stem receiving bore with the flexible flap adjacent to the outboard end of the piston head, a plurality of fluid passages extending through the piston plug in alignment with the flexible flap to enable fluid flow through the passages in one direction but preclude fluid flow in an opposite direction.

15. Whale release apparatus according to claim 14 in which the metering fluid passage includes a tube extending through the piston plug disposed out of alignment with the flexible flap.

16. Whale release apparatus according to claim 12 in which a fluid channel extends through the piston rod along its longitudinal axis to provide means for loading the chamber with a selected fluid and further including a sealing member to close the fluid passage after the fluid is loaded in the chamber.

17. Whale release apparatus according to claim 12 in which a locking member extends from the piston head in the direction of the longitudinal axis and a locking member receiving recess is formed in the closed end of the housing bore aligned with the locking member, the locking member releasably lockable in the locking member recess when the piston head is at the closed end of the housing bore.

* * * * *